United States Patent [19]

Siring

[11] Patent Number: 5,203,068
[45] Date of Patent: Apr. 20, 1993

[54] METHOD OF CONNECTING A VEHICLE BRAKE CABLE EQUALIZER

[76] Inventor: Andrew J. Siring, 2640 Seymour Lake Rd., Ortonville, Mich. 48462

[21] Appl. No.: 925,827

[22] Filed: Aug. 7, 1992

[51] Int. Cl.⁵ .................. B21D 39/00; B60T 1/00; F16C 1/10
[52] U.S. Cl. .................................. 29/452; 29/450; 29/451; 188/2 D; 74/501.5 R
[58] Field of Search .................. 29/450, 451, 452; 188/2 D; 74/501.5 R; 403/353, 360

[56] References Cited

U.S. PATENT DOCUMENTS

| 4,914,971 | 4/1990 | Hinkens et al. ............. 74/502.2 |
| 5,016,490 | 5/1991 | Jaksic ........................ 188/2 D |

FOREIGN PATENT DOCUMENTS

| 2429665 | 1/1976 | Fed. Rep. of Germany ..... 188/2 D |
| 0104128 | 8/1979 | Japan ........................ 188/2 D |

OTHER PUBLICATIONS

GB 2214257, UK Pat App, Hoyle.

Primary Examiner—Mark Rosenbaum
Assistant Examiner—Kenneth J. Hansen
Attorney, Agent, or Firm—Edward A. Craig

[57] ABSTRACT

A method is provided for connecting a vehicle brake cable equalizer to a main actuator cable extending from the forward section of a vehicle and to a pair of brake actuator cables extending from the rear wheel brakes of the vehicle. The main actuator cable and brake cable equalizer are positioned on the upper side of the vehicle floor and the brake actuator cables are positioned on the lower side of the vehicle floor. In the method, the main actuator cable is connected to the brake cable equalizer entirely from the upper side of the vehicle floor and the brake actuator cables are connected to the brake cable equalizer entirely from a position on the lower side of the vehicle floor. The connection of the brake actuator cables is accomplished without the need for the assembler to have visual contact with the brake cable equalizer.

2 Claims, 5 Drawing Sheets

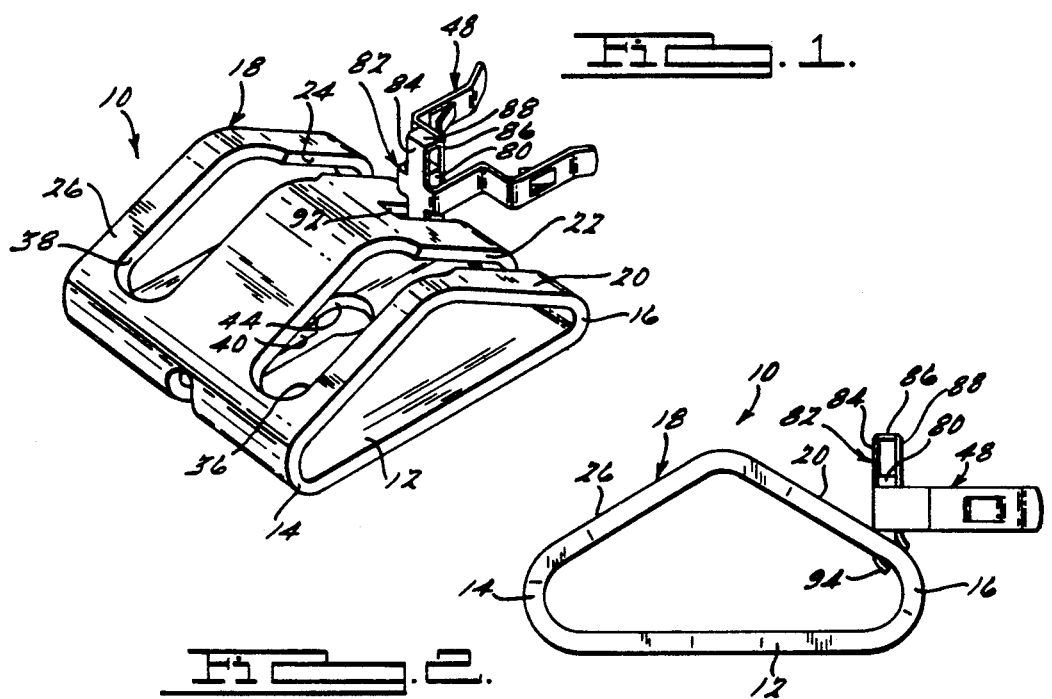
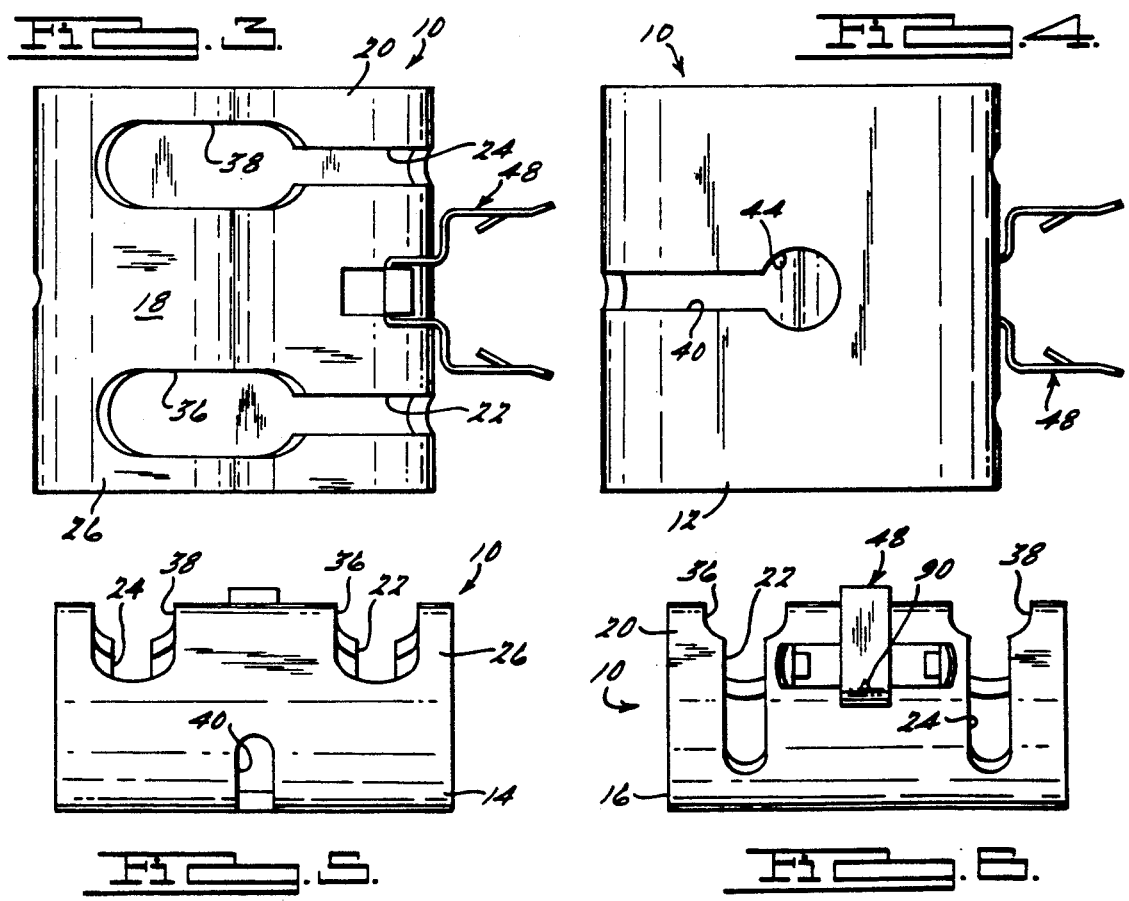

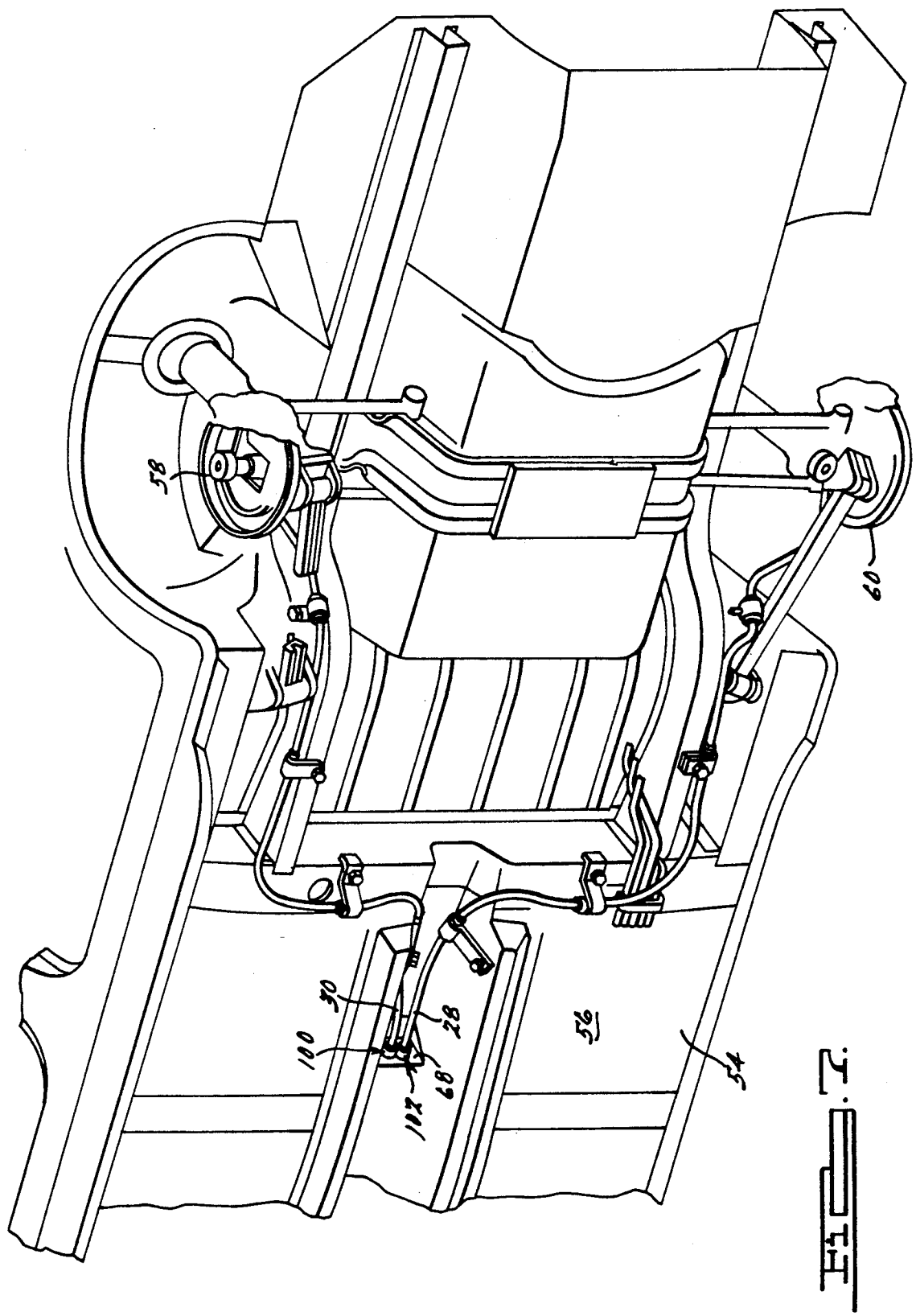

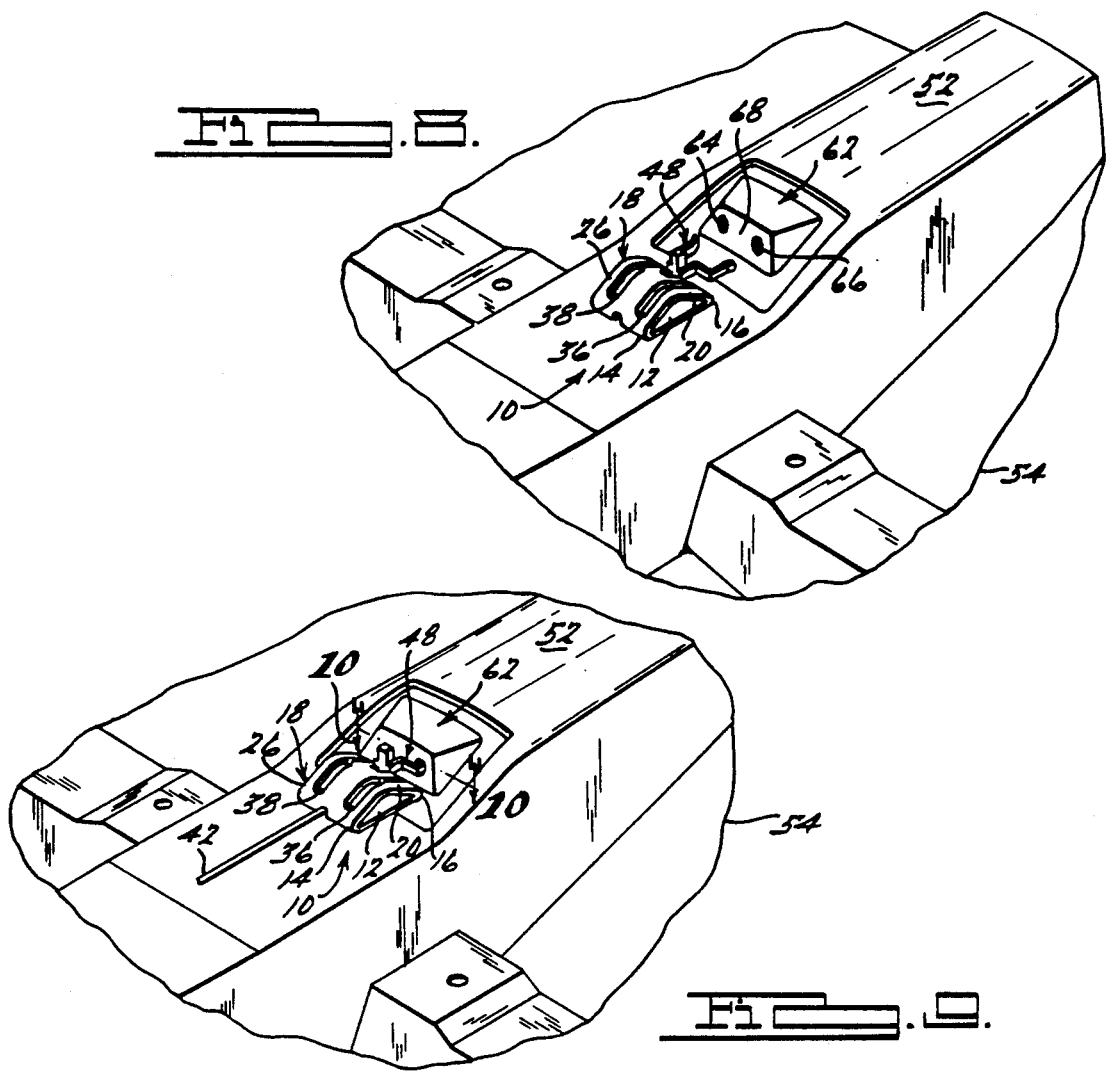
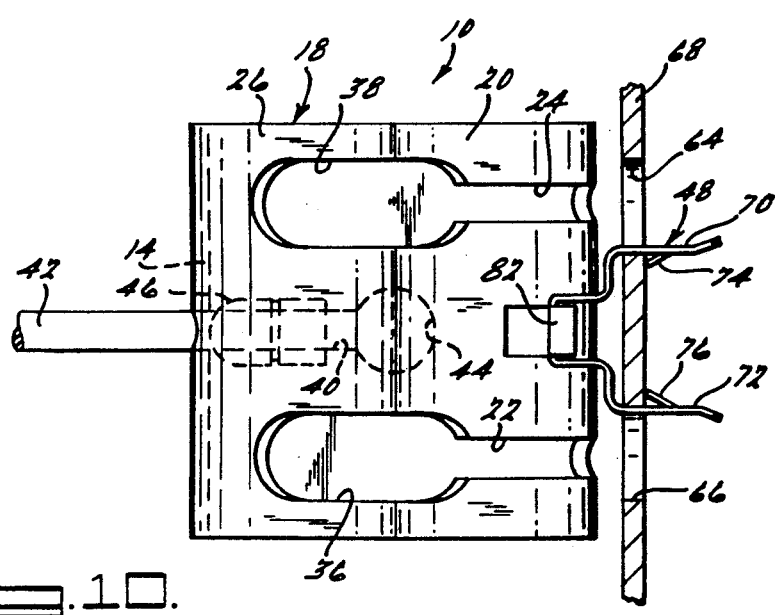

METHOD OF CONNECTING A VEHICLE BRAKE CABLE EQUALIZER

BACKGROUND OF THE INVENTION

1. Field of the Invention

The invention relates to a method of connecting a vehicle brake cable equalizer to a main actuator cable and a pair of brake actuator cables.

2. Description of Related Art

Vehicle parking brakes for the rear wheels of a vehicle are commonly actuated by means of a mechanical cable connection extending from the forward section of the vehicle to the rear wheels of the vehicle. At the forward end, the brake cable is connected to a manually operable device such as a hand lever or depressible pedal actuated by the driver after the vehicle has been parked in order to insure that the vehicle will not inadvertently move from its parked location. The cable structure normally includes a single main actuator cable extending from the manual actuator towards the rear of the vehicle on the upper surface of the vehicle floor. A pair of cables extend from the rear wheels forwardly of the vehicle on the underside of the vehicle floor. An opening is provided intermediately forward and rearward ends of the vehicle floor for passage of the brake actuator cables therethrough into connection with the main actuator cable. These cables are connected together by means of the brake cable equalizer. The function of the brake cable equalizer is to make sure that the tension exerted against each of the brake actuator cables is the same. This is accomplished by permitting a small amount of pivoting of the equalizer which occurs until the tension on each brake actuator cable is equal.

Difficulty has been encountered in the process of connecting the brake actuator cables to the equalizer. The brake actuator cables are inserted through openings provided in the vehicle floor to a position where the ends thereof are on the upper surface of the vehicle floor. The assembler, who is inserting the cables from below through the vehicle floor, cannot see the brake equalizer and thus must be able to make a "blind" connection. Otherwise, it is necessary for the assembler to leave his position on the underside of the vehicle floor and enter the vehicle in order to grab the ends of the brake actuator cables and make the desired connection to the brake cable equalizer which is located on the upper surface of the vehicle floor. As will be appreciated, such movement of the part of the assembler is time consuming and results in a higher assembly cost. It is therefore desirable to provide means permitting the assembler to make the connection to the equalizer from his position on the underside of the vehicle floor.

This is accomplished in accordance with the present invention by providing a vehicle brake cable equalizer and method for installation which permits the blind connection of the brake actuator cables with the equalizer from a point beneath the vehicle floor without the assembler actually seeing the connection being made.

SUMMARY OF THE INVENTION

A method of connecting a vehicle brake cable equalizer to a main actuator cable extending from the forward section of the vehicle and a pair of brake actuator cables extending from the rear wheels of the vehicle is provided. The main actuator cable and brake cable equalizer are positioned on the upper side of the vehicle floor and the brake actuator cables are positioned on the lower side of the vehicle floor.

The method includes the steps of providing a brake cable equalizer having first slot means for attaching a main actuator cable and second and third slot means for attaching a pair of brake actuator cables, the brake cable equalizer having a ramp in which the second and third slot means are located; providing a pair of spaced apart openings in a vehicle floor for insertion of the ends of the pair of brake actuator cables from the lower side of the vehicle floor to the upper side thereof; providing an enlarged head on the end of each brake actuator cable; providing an enlarged opening at the terminus of each of the second and third slot means; and providing fastener means on the brake cable equalizer including a pair of arms insertable through the openings in the vehicle floor for engagement with the vehicle floor.

The main actuator cable is attached in the first slot means of the brake cable equalizer on the upper side of the vehicle floor and the brake cable equalizer is secured to the upper side of the vehicle floor by means of the fastener arms. Normal brake tension is then applied to the main actuator cable from the upper side of the vehicle floor.

The enlarged head of each brake cable actuator is then inserted from the lower side of the vehicle floor through one of the openings in the vehicle floor. The enlarged heads of each brake cable actuator are slid up the ramp from the lower side of the vehicle floor using the second and third slots means as guides until the enlarged heads pass through the enlarged openings at the terminus of the second and third slot means. The brake actuator cables are then pulled from the lower side of the vehicle floor until the enlarged heads thereof abut against the ramp. Then, the arms of the fastener means are freed from the lower side of the vehicle floor from engagement with the vehicle floor.

A sealing plug is provided on each brake actuator cable at a location on the lower side of the vehicle floor. Each plug is inserted into the opening vehicle floor through which its respective brake cable actuator cable passes after the brake actuator cable has been attached to the equalizer.

IN THE DRAWINGS

FIG. 1 is a view in perspective of a vehicle brake cable equalizer utilized in connection with one embodiment of the present invention;

FIG. 2 is a side elevational view of the brake cable equalizer of FIG. 1;

FIG. 3 is a top plan view of the brake cable equalizer of FIG. 1;

FIG. 4 is a bottom plan view of the brake cable equalizer of FIG. 1;

FIG. 5 is an end elevational view of the brake cable equalizer as viewed from the left of FIG. 3;

FIG. 6 is an end elevational view of the brake cable equalizer as viewed from the right of FIG. 4;

FIG. 7 is a perspective view taken from the underside of a vehicle floor illustrating the arrangement of the brake actuator cables;

FIG. 8 is a view in perspective of a portion of the upper side of vehicle floor illustrating the brake cable equalizer prior to securement thereof to the vehicle floor;

FIG. 9 is a perspective view similar to FIG. 8 illustrating the brake cable equalizer after the main actuator cable has been attached thereto and the brake cable equalizer has been secured to the vehicle floor;

FIG. 10 is a top plan view of the structure of FIG. 9 taken partially in section along the line 10—10 of FIG. 9 looking in the direction of the arrows;

DETAILED DESCRIPTION OF A PREFERRED EMBODIMENT

Figure 11:
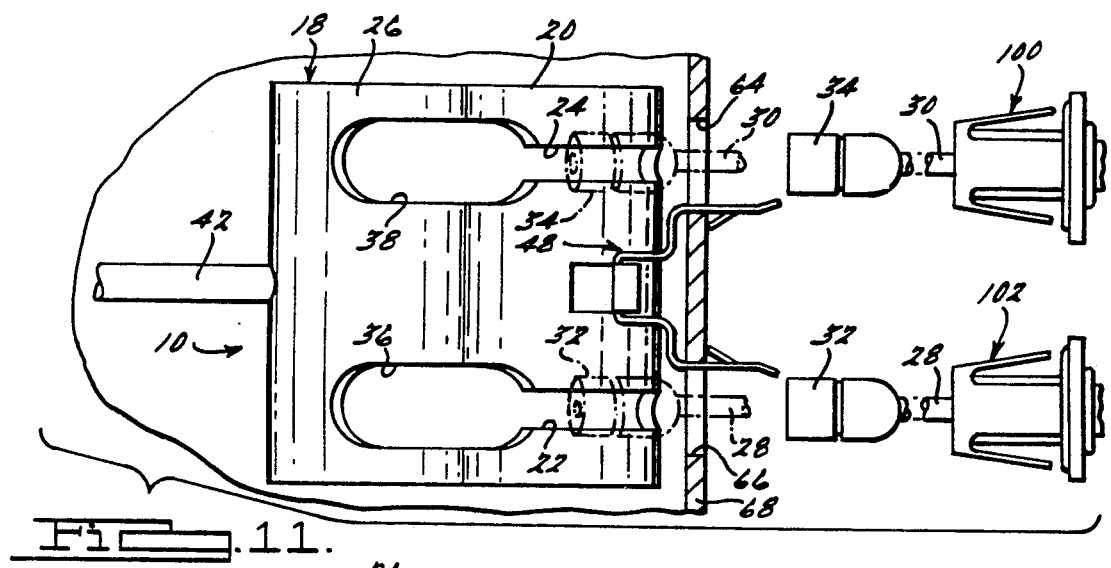
FIG. 11 is a view similar to FIG. 10 illustrating insertion of the brake actuator cables from the underside of the vehicle floor through openings in the vehicle floor with the enlarged heads at the ends of the cables shown in dotted lines sliding up a ramp in the brake cable equalizer.

The rear wheel parking brakes for vehicles are commonly actuated to braking and non-braking conditions by means of a hand lever or depressible pedal located forwardly of the vehicle for easy access by the driver. Usually, a rachet mechanism is employed to fix the parking brake in braking condition upon actuation of the hand lever or brake pedal. A main actuator cable is connected to the rachet mechanism and extends rearwardly on the upper surface of the vehicle floor and terminates at a point short of the position of the rear wheels. A spring is usually provided associated with the rachet mechanism to apply tension to the main actuator cable at times when the parking brakes are not engaged. In this way, the braking structure is always under tension with the result that when the hand lever or brake pedal is actuated, braking tension is immediately applied to the parking brakes in the rear wheels. Such a structure is illustrated in U.S. Pat. application Ser. No. 819,911, filed Jan. 13, 1992 (incorporated herein by reference). The main actuator cable is connected to a vehicle brake cable equalizer which is also positioned on the upper surface of the vehicle floor. A pair of brake actuator cables are provided, one being connected to each of the rear wheel brakes. These cables extend on the underside of the vehicle floor and pass through openings in the vehicle floor into connection with the vehicle brake cable equalizer. During assembly of the vehicle, it is advantageous to provide means for the "blind" connection of the brake actuator cables to the brake cable equalizer from the underside of the vehicle. The assembler cannot see the brake cable equalizer and it is therefore necessary to provide some means for the assembler to merely pass the brake actuator cables through the openings in the vehicle floor into automatic connection with the brake cable equalizer without having to leave his position from beneath the vehicle and move to a position on the upper side of the vehicle floor. The function of the vehicle brake cable equalizer is to be sure that equal tension is applied to each of the brake actuator cables. This is accomplished by permitting the brake cable equalizer to pivot a small distance either clockwise or counterclockwise to compensate for small dimensional differences which occur between the brake actuator cables.

FIGS. 1-6 illustrate a vehicle brake cable equalizer adapted to permit the desired blind connection of the brake actuator cables from a position beneath the vehicle floor. The brake cable equalizer 10 comprises a base 12 having a forward end portion 14 and a rearward end portion 16. A ramp 18 is provided having a least a portion 20 extending at an angle upwardly and forwardly from the rearward end portion 16 of the base 12. The ramp 18 has a pair of spaced apart elongated brake actuator cable slots 22, 24 extending upwardly and forwardly from the rearward end portion 16 of the base 12 into the portion 20. A second portion 26 of the ramp 18 extends at an angle downwardly and forwardly from the portion 20 into connection with the forward end portion 14 of the base 12, thereby defining a triangular shape as viewed from the end as will be noted in FIG. 2. Each elongated slot 22, 24 is of sufficient width to permit passage therethrough of a brake actuator cable 28, 30, but of insufficient width to permit passage therethrough of the enlarged heads 32, 34 provided at the terminus of each of cables 28, 30 as will be noted in FIG. 11.

An enlarged opening 36, 38 is provided in the ramp 18 at the forward end of each elongated slot 22, 24. It will be noted that the enlarged openings 36, 38 begin in the portion 20 and terminate in the portion 26. The enlarged openings 36, 38 are of sufficient size to permit passage therethrough of the enlarged heads 32, 34 provided at the terminus of each brake actuator cable 28, 30. This permits brake actuator cables 28, 30 to be connected to the brake cable equalizer 10 by sliding the enlarged heads 32, 34 up the ramp 18 using elongated slots 22, 24 as a guide until the enlarged heads pass through the enlarged openings at the forward end of the slots and the cables pass through the elongated slots. The brake actuator cables 28, 30 are then pulled rearwardly until the enlarged heads abut against the rearward end portion 16.

An elongated main actuator cable slot 40 extends from the forward end portion 14 through the base 12 and terminates intermediate the forward and rearward ends of the base. The slot 40 is of sufficient width to permit passage therethrough of the main actuator cable 42, but of insufficient width to permit passage therethrough of the enlarged head 46 provided at the terminus of the main actuator cable 42. An enlarged opening 44 is provided at the rearward end of the slot 40. The opening 44 is of sufficient size to permit passage therethrough of the enlarged head 46 provided at the terminus of the main actuator cable 42. As will be noted, the opening 44 is circular and it is necessary to pass the head 46 (which is cylindrical in form) therethrough from an upstanding position. This does not present a problem inasmuch as the assembler of this componentry is positioned on the upper surface of the vehicle floor and can see the cable equalizer 10 which permits the desired manipulation of the head 46. After insertion of the head 46 through the opening 44, the main actuator cable 42 is relatively moved with respect to the brake cable equalizer 10 until the head 46 abuts against the forward end portion 14 as illustrated in FIG. 10.

Fastener means in the form of a clip 48 are provided on the ramp portion 20 for temporarily securing the vehicle brake cable equalizer 10 to vehicle structure while the brake actuating cables 28, 30 are connected thereto. As will be noted in FIGS. 8 and 9, the main actuator cable 42 and brake cable equalizer 10 are positioned on the upper side 52 of the vehicle floor 54. As will be noted in FIG. 7, the brake actuator cables 28, 30 are positioned on the lower side 56 of the vehicle floor 54. These cables are routed to the rear wheel brakes 58, 60.

Referring to FIGS. 8-10, it will be noted that a triangularly shaped projection 62 is provided on the vehicle floor 54. A pair of spaced apart openings 64, 66 are provided in wall 68 of the projection 62 for insertion of the ends of the pair of brake actuator cables 28, 30 from the lower side 56 of the vehicle floor 54 to the upper side 52 thereof. The openings 64, 66 are also used to temporarily mount the cable equalizer 10 and to route the brake actuator cables 28, 30 to the upper floor side 52.

Figure 14:
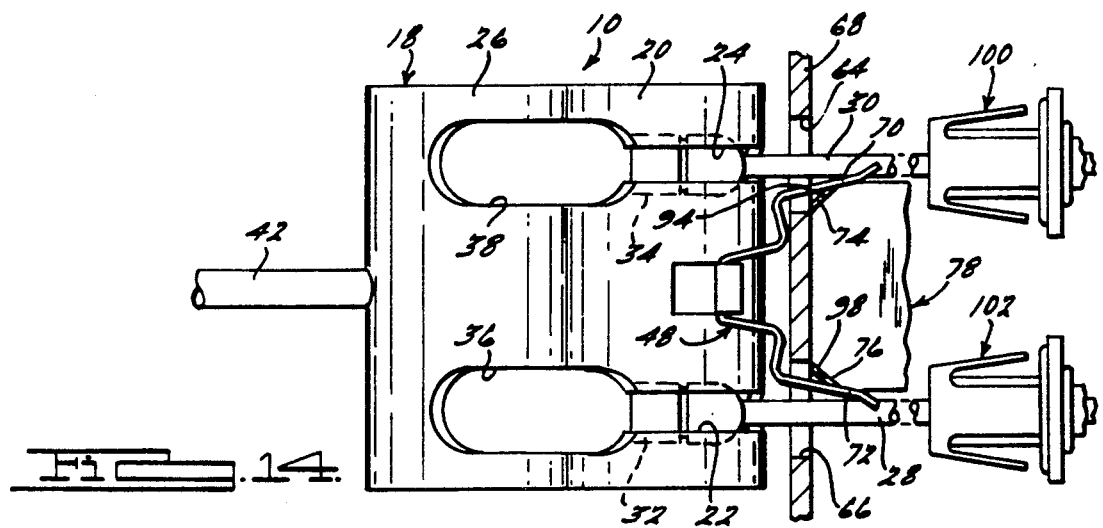
FIG. 14 is a view similar to FIG. 13 illustrating disengagement of the fastening means securing the brake cable equalizer to the vehicle floor.

The clip 48 has a pair of spaced apart spring arms 70, 72. Each spring arm has a forwardly directed tang 74, 76 thereon. The spring arms 70, 72 are insertable through the openings 64, 66 with said tangs 74, 76 being flexed from an at rest position by the vehicle structure surrounding the openings 64, 66 during the insertion process. The tangs thereafter spring back to the at rest position and contact the vehicle structure to prevent withdrawal of the spring arms 70, 72 as shown in FIG. 10. The tangs 74, 76 are later manually flexed by means of a tool 78 as shown in FIG. 14 to permit withdrawal of the spring arms 70, 72 after the brake actuator cables 28, 30 have been connected to the brake cable equalizer 10.

An upstanding tab 80 is provided on the ramp portion 20 adjacent the rearward end portion 16 of the brake cable equalizer 10. The clip 48 has a U-shaped clasp 82 including first and second spring legs 84, 86 joined together at one end by a bridge 88. The other ends of the spring legs 84, 86 are unattached. The first spring leg 84 joins the spring arms 70, 72 together at one end. The second spring leg 86 is free to flex. The clasp 82 is receivable on the tab 80 to secure the clip 48 to the brake cable equalizer 10. The second spring leg 86 has a forwardly directed tang 90 thereon to engage the tab 80 and inhibit removal of clip 48. The ramp portion 20 is provided with an opening 92 adjacent to the tab 80. The first spring leg 84 extends through the opening 92 and has a rearwardly bent portion 94 which engages the underside of the ramp portion 20.

After the main actuator cable 42 is attached to the brake cable equalizer 10, the brake cable equalizer is temporarily secured to the vehicle floor 54 as shown in FIGS. 9 and 10. After this has occurred, normal brake tension is applied to the main actuator cable 42 from the upper side of the vehicle floor. This is accomplished by applying spring force to the cable by means of the spring conventionally provided in the parking brake structure (not shown). The assembly at this time is ready for connecting the brake actuator cables 28, 30 from a point beneath the vehicle floor 54. It will be appreciated that prior to the showing in these figures, the main actuator cable 42 has been connected to the brake cable equalizer 10, the brake cable equalizer 10 has been secured to the vehicle floor 54, and tension has been applied to the main actuator cable 42, all of these steps having been accomplished by an assembler from the upper side 52 of the vehicle floor 54. The assembler may then assume a position on the lower side 56 of the vehicle floor 54 and finish connecting the brake actuator cables 28, 30, all from the lower side 56.

Figure 12:
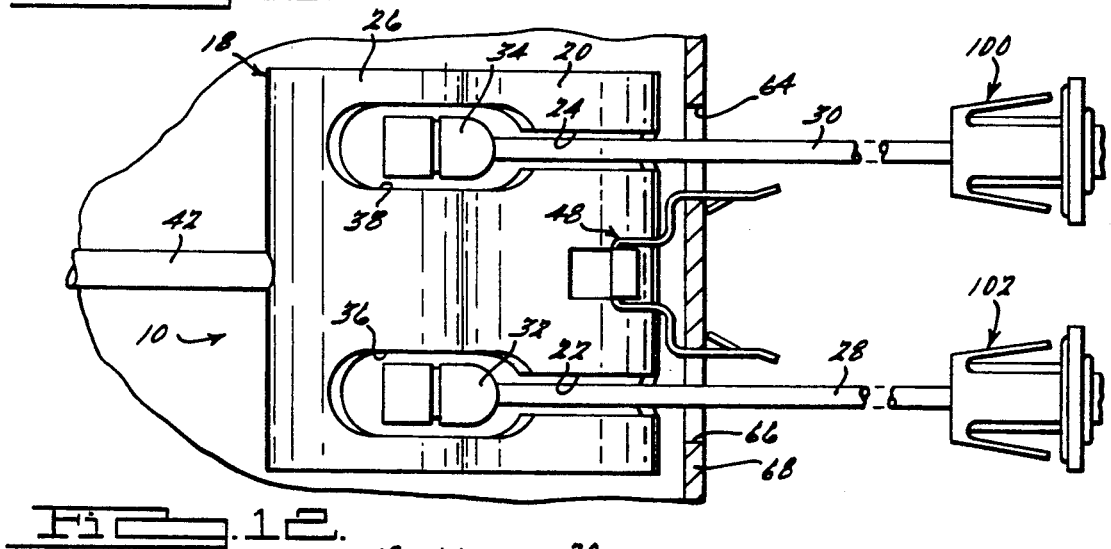
FIG. 12 is a view similar to FIG. 11 illustrating the enlarged heads entering enlarged openings in the brake cable equalizer.
Figure 13:
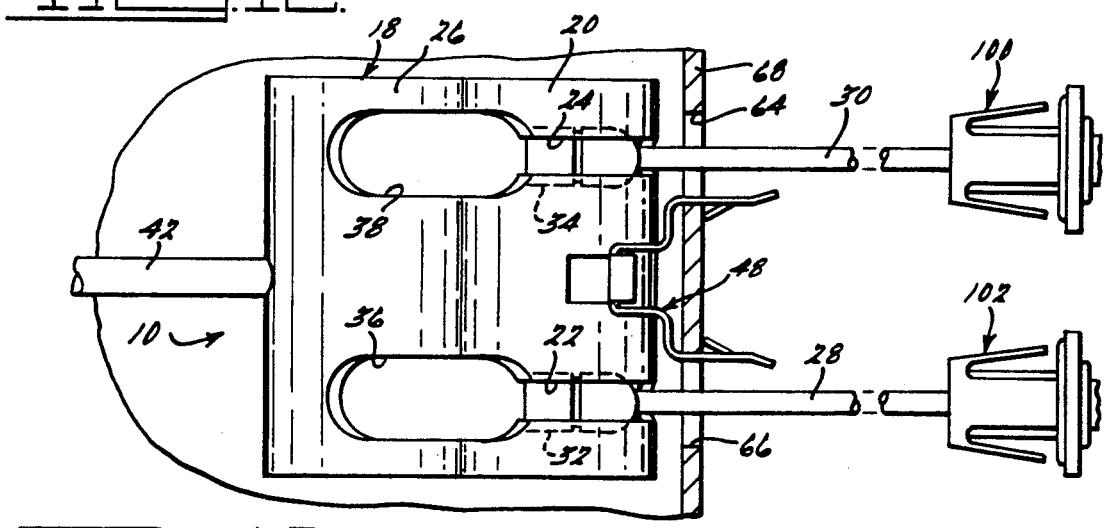
FIG. 13 is a view similar to FIG. 12 illustrating the enlarged heads of the brake, actuator cables abutting against the brake cable equalizer ramp.

As illustrated in FIG. 11, the brake actuator cables 28, 30 are first inserted through the openings 64, 66. The enlarged heads 32, 34 are then slid up the ramp portion 20 using the elongated slots 22, 24 as guides until the enlarged heads 32, 34 pass through the enlarged openings 36, 38 at the terminus of the elongated slots 22, 24. This occurrence is illustrated in FIG. 12. The brake actuator cables 28, 30 are then pulled rearwardly by the assembler until engagement is made with the rearward end portion 16 of the brake cable equalizer 10. This process is shown in FIG. 13. As will be appreciated, the assembler does not have to see the brake cable equalizer 10 in order to accomplish these steps inasmuch as it is only necessary to pass the enlarged heads 32, 34 through the openings 64, 66 which are visible to the assembler from the lower side of the vehicle floor and then pull on the cables.

Figure 15:
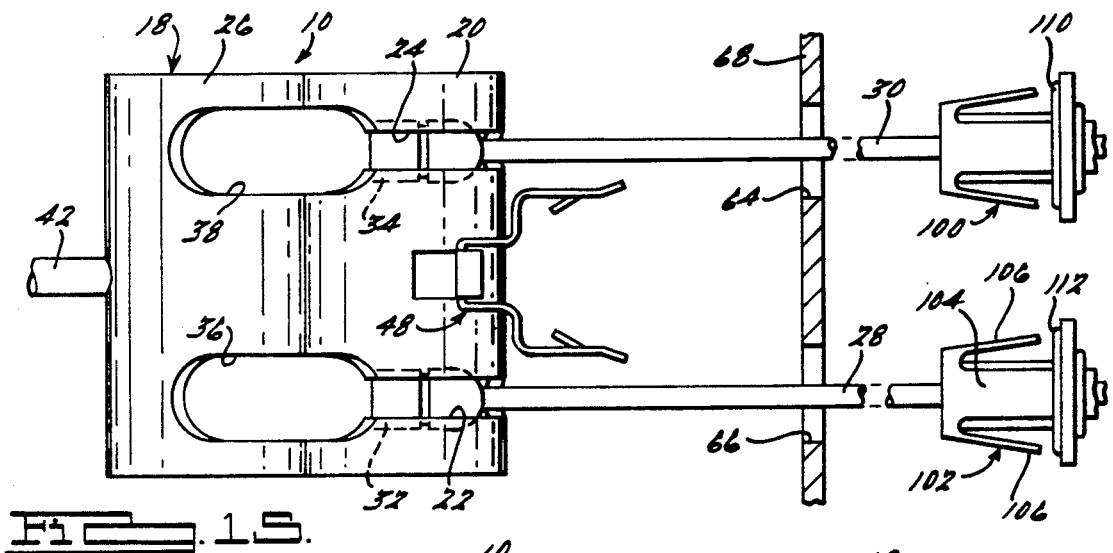
FIG. 15 is a view similar to FIG. 14 illustrating movement of the brake cable equalizer to draw portions of the brake actuator cables forwardly of the vehicle floor.
Figure 16:
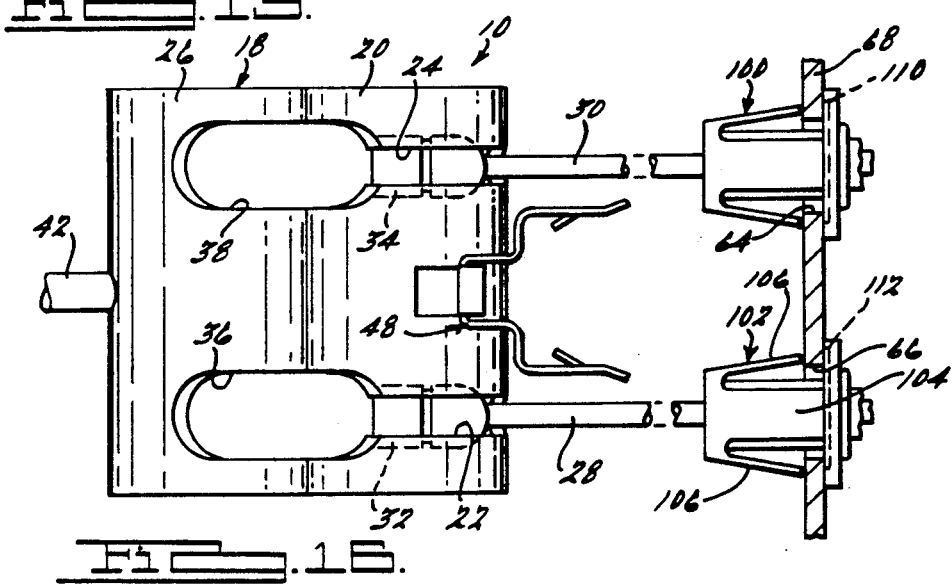
FIG. 16 is a view illustrating the final assembly of the cable structure with sealing plugs positioned in the openings of the vehicle floor through which the brake actuator cables pass.

At this point, as shown in FIG. 14, the assembler releases the tangs 74, 76 from engagement with the vehicle floor to permit removal of the clip 48 from engagement with the vehicle floor. This is accomplished by means of a hand tool 78 having beveled forward edges 96, 98. The tool 78 is inserted between the spring arms 70, 72 causing the spring arms to spread sidewardly to a position where the tangs 74, 76 will not engage. The tension which has previously been applied to the main actuator cable 42 will then cause the brake cable equalizer 10 to be pulled to the left, as viewed in FIG. 14, to a position illustrated in FIG. 15. This movement will draw portions of the brake actuator cables 28, 30 through the openings 64, 66. A sealing plug 100, 102 is provided on each of the cables. The sealing plugs include a cylindrical portion 104 having a plurality of outwardly flexed arms 106 spaced around the periphery thereof. The arms 106 pass through the openings 64, 66 (flexing inwardly to permit such passage). After the arms 106 have passed through the openings, they flex outwardly as illustrated in FIG. 16 preventing withdrawal of the sealing plugs 100, 102. Each sealing plug has a circular sealing element 110, 112 which impinges against the wall 68 to thereby seal the openings 64, 66. Positionment of the sealing plugs 100, 102 is accomplished by the assembler, again from a position on the lower side of the vehicle floor 54.

I claim:

1. The method of connecting a vehicle brake cable equalizer to a main actuator cable extending from a forward section of a vehicle and a pair of brake actuator cables extending from a pair of rear wheel brakes of the vehicle wherein the main actuator cable and brake cable equalizer are positioned on the upper side of a floor of the vehicle and the brake actuator cables are positioned on the lower side of the vehicle floor, comprising the steps of:

a. providing a brake cable equalizer having first slot means for attaching the main actuator cable and second and third slot means for attaching the pair of brake actuator cables, the brake cable equalizer having a ramp in which the second and third slot means are located;

b. providing a pair of spaced apart openings in the vehicle floor for insertion of an end of each of the pair of brake actuator cables from the lower side of the vehicle floor to the upper side thereof;

c. providing an enlarged head on the end of each brake actuator cable;

d. providing an enlarged opening at an terminus of each of the second and third slot means;

e. providing fastener means on the brake cable equalizer including a pair of arms insertable through the openings in the vehicle floor for engagement with the vehicle floor;

f. attaching the main actuator cable in the first slot means of the brake cable equalizer on the upper of the vehicle floor and securing the brake cable equalizer to the upper side of the vehicle floor by means of the fastener arms;

g. applying brake tension to the main actuator cable from the upper side of the vehicle floor;

h. inserting the enlarged head of each brake cable actuator from the lower side of the vehicle floor through one of the openings in the vehicle floor;

i. attaching the brake cable actuators to the brake cable equalizer by sliding the enlarged heads of each brake cable actuator up the ramp from the lower side of the vehicle floor using the second and third slot means as guides until the enlarged heads thereof pass through the enlarged openings at the terminus of the second and third slot means; and j. freeing the arms of the fastener means from the lower side of the vehicle floor from engagement with the vehicle floor to thereby detach the brake cable equalize from the vehicle floor.

2. The method, as set forth in claim 1, further characterized in attaching a sealing plug to each brake actuator cable at a point on the lower side of the vehicle floor and inserting each sealing plug into the opening in the vehicle floor through which its respective brake actuator cable passes after the brake actuator cable has been attached to the brake cable equalizer.

* * * * *